United States Patent [19]

Rendon-Herrero

[11] Patent Number: 5,226,279
[45] Date of Patent: Jul. 13, 1993

[54] SEALING METHOD FOR THE TREATMENT OF PORTLAND CEMENT CONCRETE

[76] Inventor: Oswald Rendon-Herrero, 1550 Cavalieri St., Urb. Belisa, Rio Piedras, P.R. 00928

[21] Appl. No.: 848,667

[22] Filed: Mar. 9, 1992

[51] Int. Cl.⁵ .............................................. E04B 1/00
[52] U.S. Cl. ...................................... 52/743; 52/741.4; 106/33
[58] Field of Search .................. 52/741.4, 743, 169.14; 106/33, 468; 252/315.2, 315.5

[56] References Cited

U.S. PATENT DOCUMENTS

| | | | |
|---|---|---|---|
| 2,277,286 | 3/1942 | Bechtner | 61/30 |
| 2,679,478 | 5/1954 | Fischer | 252/8.5 |
| 2,898,759 | 8/1959 | Pebley | 72/126 |
| 3,407,552 | 10/1968 | Cassidy | 52/169 |
| 3,469,406 | 9/1969 | Braden | 61/36 |
| 3,566,968 | 3/1971 | Marx | 166/294 |
| 3,630,762 | 12/1971 | Olton | 106/2 |
| 3,705,838 | 12/1972 | Olton | 161/206 |
| 4,302,917 | 12/1981 | Fermvik | 52/741.4 X |
| 4,520,073 | 5/1985 | Randolph et al. | 428/405 |
| 4,634,538 | 1/1987 | Alexander | 252/8.514 |
| 4,647,259 | 3/1987 | Magaritz et al. | 405/270 |
| 4,693,923 | 9/1987 | McGroarty et al. | 428/148 |
| 4,744,193 | 5/1988 | Hatsuzaki et al. | 52/744 |
| 4,775,567 | 10/1988 | Harkness | 52/169.14 X |
| 4,837,085 | 6/1989 | McGroarty | 421/451 |
| 4,939,878 | 7/1980 | Schuhbauer | 52/169.14 |
| 5,063,006 | 11/1991 | Tahara | 52/743 X |
| 5,158,803 | 10/1992 | Haas | 106/33 X |

Primary Examiner—Carl D. Friedman
Assistant Examiner—Beth A. Aubrey
Attorney, Agent, or Firm—Walker, McKenzie & Walker

[57] ABSTRACT

Dry powdered montmorillonite clay particles are thoroughly and vigorously mixed with water to form a suspension. The suspension is then spread over a concrete slab or the like and allowed to seep through any hairline cracks or interconnected pores in the concrete. As the suspension seeps through the cracks and/or pores, the clay particles are gradually filtered out of the suspension and clog or seal the cracks and/or interconnected pores.

4 Claims, 2 Drawing Sheets

SEALING METHOD FOR THE TREATMENT OF PORTLAND CEMENT CONCRETE

BACKGROUND OF THE INVENTION

1. Field of the Invention

The present invention relates, in general, to a treatment method for sealing leaking concrete roof slabs and the like and, more specifically, to a sealing method for treating porous portland cement concrete slabs and/or portland cement concrete slabs containing hairline cracks.

2. Description of the Related Art

Current methods for sealing leaking concrete roof slabs utilize the layering or lamination of asphalt/tar-based materials and the like, which are placed directly on the surface of the slab. These materials eventually crack or delaminate and once again allow water to seep through the concrete slab.

Preliminary patentability searches in at least class 52, subclass 169.14, class 106, subclasses 33 and 468; class 126, subclasses 33 and 368; and class 252, subclasses 315.2, 315.5 and 378 produced the following patents which may relate to the present invention:

Bechtner, U.S. Pat. No. 2,277,286, issued Mar. 24, 1942, discloses a method for impeding the flow of water and for reinforcing structures to prevent the seepage of water therethrough. The Bechtner methods consist generally of placing an insert, mass or blanket of swellable bentonite (i.e., clay) in a compartment formed within the structure. This insert, mass or blanket of swellable bentonite is activated by water after it is installed in the structure. That is, the insert, mass or blanket of bentonite is installed during construction of the structure and then, if water leaks through the structure to the compartment, the bentonite will swell to prevent the seepage of water past the compartment.

Fischer, U.S. Pat. No. 2,679,478, issued May 25, 1954, discloses a drilling fluid comprising water, clay, and between about 0.01% and 10% by weight of water dispersible methyl cellulose for use in the drilling of oil and gas wells.

Pebley, U.S. Pat. No. 2,898,759, issued Aug. 11, 1959, discloses a method of repairing a basement wall by forming a cavity in the earth adjacent the leak, then filling the cavity with dry bentonite, and then subjecting the bentonite to moisture to form a gel and swell in the cavity against the leak.

Cassidy, U.S. Pat. No. 3,407,552, issued Oct. 29, 1968, discloses a method of waterproofing a basement by removing soil to form an excavation exposing the basement wall, filling the bottom portion of the excavation with a dry granular water expansible material, placing a removable division wall in position in the excavation in spaced relation to the outer surface of the basement wall to define a first space between the division wall and the outer surface of the basement wall and a second space between the division wall and the opposite vertical face of the excavation, filling the first and second spaces respectively with dry granular water expansible material and with a water permeable aggregate material, and then removing the division wall.

Braden et al., U.S. Pat. No. 3,469,406, issued Sep. 30, 1969, discloses a method of treating soil containing a water sensitive clay to stabilize the clay against swelling by mixing the soil with a guanidine salt in a polar oxygenated aliphatic hydrocarbon solvent of a prescribed type and compacting the treated admixture.

Marx, U.S. Pat. No. 3,566,968, issued Mar. 2, 1971, discloses a method for plugging and preventing lost circulation in a subterranean formation penetrated by a well bore by forcing a volume of synthetic sponge particles of regenerated cellulose into the formation and then expanding the sponge particles by contacting the sponge particles with water.

Olton et al., U.S. Pat. No. 3,630,762, issued Dec. 28, 1971, and Olton et al., U.S. Pat. No. 3,705,838, issued Dec. 12, 1972, disclose waterproofing barriers for use as a protective layer in a below grade concrete roof system, etc. The barriers consist of water-swellable colloidal clay and particulate, inorganic metal salt treated with an oleaginous carboxylic acid, the latter serving to control the natural swelling of the clay while maintaining the integrity of the barrier.

Randolph et al., U.S. Pat. No. 4,520,073, issued May 28, 1985, discloses a method of pressure impregnating hydrophobic coatings onto porous mineral fillers using steam as a carrier for the coating material resulting in very water-resistant coated particles useful in filling polymeric substrates such as paints.

Alexander, U.S. Pat. No. 4,634,538, issued Jan. 6, 1987, discloses a composition including a water swellable clay and particularly a montmorillonite clay such as bentonite; xanthan gum; and one or more additional water-soluble gums for preventing the clay from settling from the composition when contacted with salt contaminated water.

Magaritz et al., U.S. Pat. No. 4,647,259, issued Mar. 3, 1987, discloses a method for sealing the bottom layer of ponds and reservoirs by mixing sand with about 5% of montmorillonite, compressing this mixture to reach a specific gravity of at least 1.6, washing the mixture with a solution of about the ionic strength and composition of seawater, and washing the mixture with fresh water until the percolating water has an electric conductivity of fresh water.

McGroarty et al., U.S. Pat. No. 4,693,923, issued Sep. 15, 1987, discloses a waterproofing sheet used to waterproof structures above and below grade. The waterproofing sheet has a single layer of non-degradable, water impermeable polymeric membrane that has layers of particles of non-hydrated sodium montmorillonite adhering to the membrane in a uniform layered thickness Hatsuzaki et al., U.S. Pat. No. 4,744,193, issued May 17, 1988, discloses a mixture for sealing water leakage in concrete structures which consists essentially of an organic polyisocyanate compound and/or a prepolymer having terminal isocyanate residues, and 2-pyrrolidone. The mixture is injected for grouting into water-leaking cracks or openings of concrete structures, diffuses into the cracks or openings, and is cured by reacting with water at the leaking sites.

McGroarty, U.S. Pat. No. 4,837,085, issued Jun. 6, 1989, discloses a waterproofing strip used to seal interfacing surfaces of building components. The waterproofing strip has a single layer of a nondegradable, water impermeable polymeric membrane that has layers of particles of non-hydrated sodium montmorillonite adhering to the walls of the opposite surfaces thereof. The strip is placed between or across interfacing surfaces of two building components to prevent water migration.

Schuhbauer, U.S. Pat. No. 4,939,878, issued Jul. 10, 1990, discloses a method of sealing structural bodies or cavity-defining walls by enclosing the structural body or wall with and enclosing wall spaced from the structural body or wall; filling the spaced formed between the structure and enclosing wall with a filler of broken stone, etc.; and introducing a flowable sealing fluid having a high viscosity into the voids left in the filler.

Nothing in the known prior art discloses or suggests the present invention. More specifically, none of the known prior art methods for sealing concrete slabs and the like involve the transport of clay particles through hairline cracks and interconnected pores in portland cement concrete and the formation of a filter cake therein.

SUMMARY OF THE INVENTION

The present invention relates to a treatment process for sealing portland cement concrete roof slabs and the like that develop hairline cracks and/or which have an unacceptably high porosity. Such cracks and high porosity allow rain and other forms of water to seep through the concrete slab via the pull of gravity, resulting in a nuisance and/or damage to the underside of the slab (i.e., the ceiling). These leakage problems decrease the value of the affected structure, lead to unwanted secondary effects, and require large expenditures of money to repair.

The present invention is unique in that the process depends on the pull of gravity to cause water to seep through a hairline crack or interconnected pores in a portland cement concrete slab, the ability of water to carry entrained colloidal-sized particles of montmorillonitic clay, the ability of water to carry the clay particles through hairline cracks and interconnected pores, and the development of a "filter cake" barrier within the cracks and pores.

Since the unit cost of clay is considerably less than asphalt tars and other chemicals now used as sealants, the cost for repairing leaking portland cement concrete roof slabs and the like using the present invention will lead to considerable savings to the user.

DESCRIPTION OF THE PREFERRED EMBODIMENT

Figure 1:
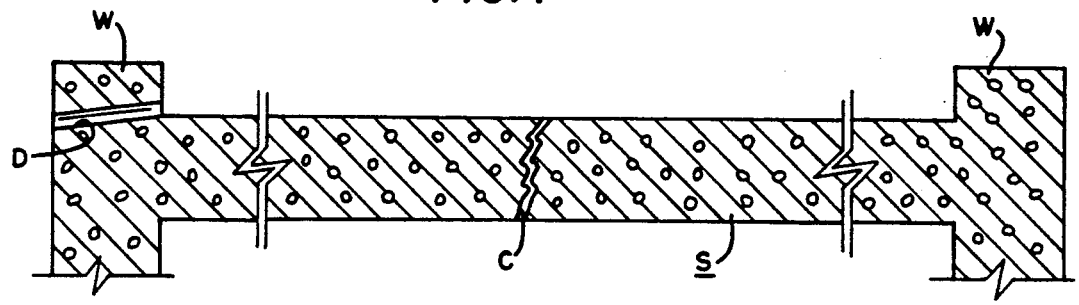
FIG. 1 is a somewhat diagrammatic sectional view of an untreated cracked and very porous portland cement concrete roof slab.
Figure 2:
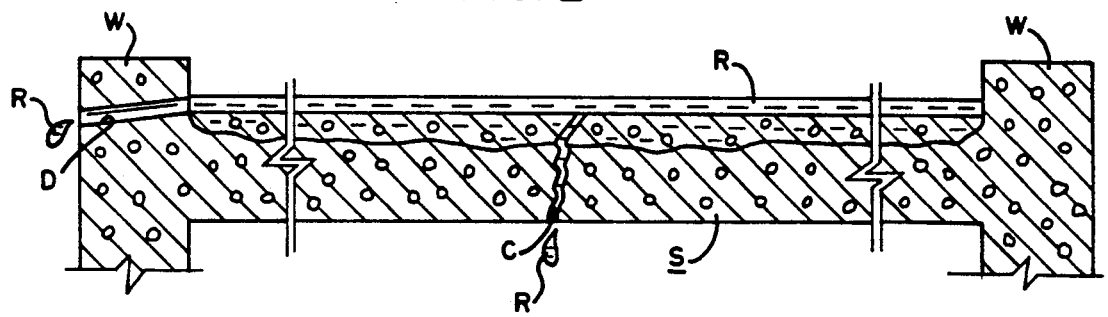
FIG. 2 is a sectional view similar to FIG. 1 but showing water "pooled" on the top surface of the slab and penetrating a crack and interconnected pores in the slab.

The preferred embodiment of the method of the present invention is used to seal one or more conduits C through a concrete slab S or the like. The term "conduit" is used herein to define hairline cracks, interconnected pores and the like in the concrete slab S that, if left unsealed, would allow water to see through the concrete slab S due to the force of gravity. The concrete slab S may be used to form a structural body or cavity defining wall, etc., that is subject to cracking. Thus, the concrete slab S may consist of a typical portland cement concrete roof slab S as shown in FIGS. 1-6. Such a concrete roof slab S typically has one or more drains D for allowing rain water and the like to drain therefrom and may include a raised parapet or wall W or the lip about the periphery thereof. A typical concrete roof slab S is shown in FIG. 1 with a conduit C therethrough. The same roof slab S is shown in FIG. 2 with water such as rain R or the like pooled-up thereon and leaking through the conduit C.

The preferred mode for practicing the present invention is to make a suspension 11 of montmorillonitic clay powder and water in a ratio of about 1 part dry powdered montmorillonite clay to about 10 parts water. Because of the clay's tendency to gel upon mixing with water, the suspension 11 must be mixed thoroughly and vigorously so that individual clay particles are discreetly suspended and entrained in the water. The water is then capable of "transporting" the clay particles when the suspension 11 is allowed to "seep" through concrete cracks and pores under the action of gravity.

Figure 3:
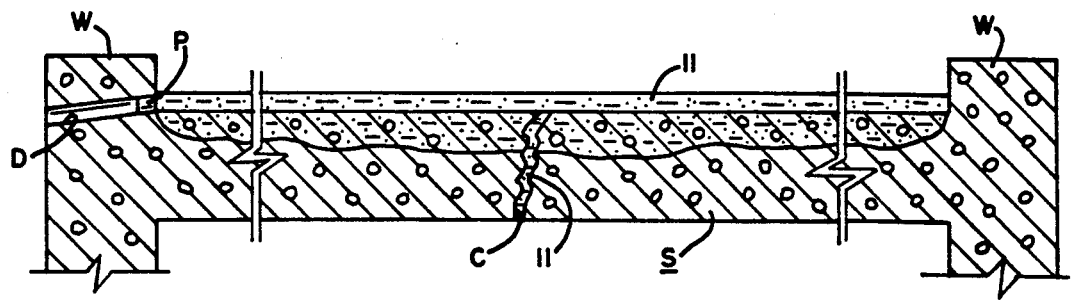
FIG. 3 is a sectional view similar to FIG. 2 but with the treating fluid of the present invention mixed with the water on the surface of the slab and sealing the crack and interconnected pores of the slab.

When an adequate mix is obtained, the suspension 11 is poured on a pre-wetted or submerged concrete slab and allowed to seep through it. The amount of clay-water mixture prepared should be enough to approximately maintain the 1 to 10 ratio of clay to water for the volume of water impounded on the concrete slab S. In FIG. 3, the drain D is shown closed with a plug P or the like and the suspension 11 of the present invention is shown pooled-up or impounded on the top of the roof slab S to a depth of about one-half inch (12.7 millimeters) over the highest point or surface of the top of the roof slab S and seeping into the interconnected pores and hairline crack (i.e., the conduit C) of the roof slab S.

Figure 4:
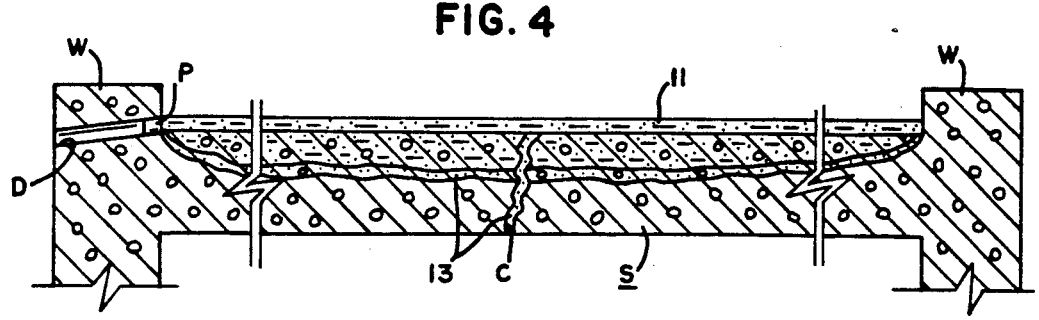
FIG. 4 is a sectional view similar to FIG. 3 but with the treating fluid of the present invention forming a "filter cake" in the slab.
Figure 5:
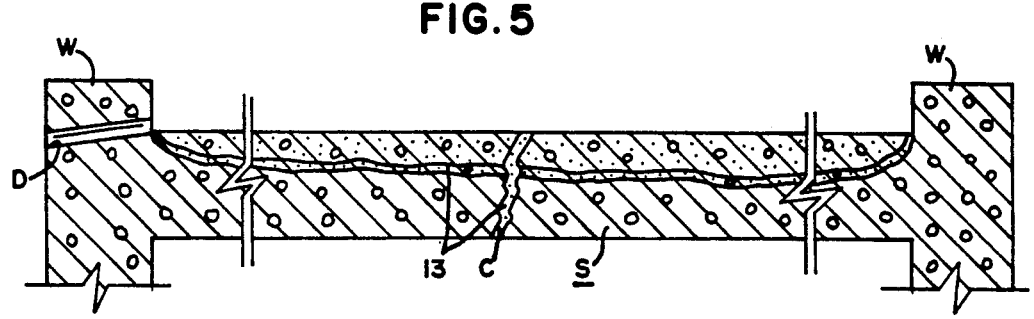
FIG. 5 is a sectional view similar to FIG. 4 but with the water evaporated from the treating fluid, leaving the clay filter cake barrier in the crack and the interconnected pores of the slab.
Figure 6:
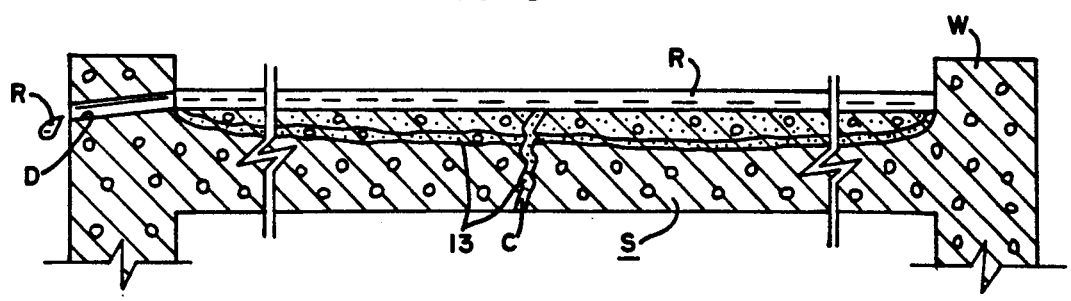
FIG. 6 is a sectional view similar to FIG. 5 but with subsequent water "pooled" on the top surface of the slab and with the clay filter cake barrier preventing the water from seeping through the crack and interconnected pores.

After the suspension 11 has been permitted to penetrate the roof slab S for a period of time, it can be spread and remixed manually via the use of a broom to obtain a relatively uniform concentration of clay and water over the roof area. As the suspension 11 "seeps" through hairline cracks and interconnected pores in the concrete, the clay particles will be gradually filtered out of suspension 11, allowing the water to seep through by itself. The clay particles then begin to accumulate and form a filter cake 13 of clay particles as shown in FIGS. 4-6, until all conduits C (i.e., hairline cracks and/or interconnected pores) clog up. In some cases, clogging does not immediately occur; however the conduit C will contain some clay particles which upon subsequent drying will re arrange themselves and, because of the new orientation of the clay particles, the dry clay particles will swell when water seeps through again and clog the conduits C. The drain D may be opened by removing the plug P, etc., after a few days to allow the excess suspension S that has not penetrated the roof slab S, or evaporated, to run off the roof slab S, etc. In any event, once the water evaporates from the suspension 11, the clay particles will remain in the conduits C as the filter cake 13 as shown in FIG. 5. Some conduits C may require more than one treatment to effectively accomplish a seal. Then, as shown in FIG. 6, water subsequently pooled or impounded on the roof slab S due to rain or the like will be inhibited from penetrating the surface of the roof slab S because of the filter cake 13.

The present invention thus involves a pre-mixed liquid suspension 11 of montmorillonite clay and water in a ratio of about 1 part clay powder and 10 parts water to form a flowable sealing fluid having a very low viscosity, approaching the viscosity of water at room temperature (e.g., at or around 70 degrees Fahrenheit). The liquid suspension is then poured on concrete roof slab cracks and/or porous slabs and allowed to penetrate or seep through the concrete via gravity flow.

Individual clay particles shrink and swell when they give up or absorb water, respectively. These clay particles are usually "flake" shaped and microscopic (i.e., they cannot be seen by the naked eye). These clay particles are also colloidal. A colloid is a particle that when suspended in water will not settle under the pull of gravity as would a sand particle that is suspended in water (i.e., the sand particle would eventually sink to the bottom).

The width of a hairline crack or interconnected air voids in portland cement concrete are considerably larger than an individual clay particle. Therefore, when the clay particles are suspended in water in small amounts and poured on concrete containing hairline cracks or large interconnected pores, the water will "seep" into the hairline cracks and/or interconnected pores, carrying the clay particles along.

The clay particles eventually begin to "dam" up and fill the cracks and/or interconnected pores and form a "filter cake" of clay particles. The clay particles in the filter cake are randomly "stacked". When the water in the filter cake evaporates, the individual clay particles undergo a re-arrangement as they shrink in the pores and cracks. The next time that water enters the cracks and pores near the surface of the concrete, the clay particles swell against each other and create a "barrier" to the water.

Additional clay-water suspension may be required periodically if the desired filter cake is insufficient or if the cracks open up wider due to shrinkage of the concrete and/or via leaching out of the clay from the filter cake, etc.

Although the present invention has been described and illustrated with respect to a preferred embodiment and a preferred use therefor, it is not to be so limited since modifications and changes can be made therein which are within the full intended scope of the invention.

I claim:

1. A method for sealing conduits through concrete, said method comprising the steps of:
   a) mixing swellable clay particles with water to form a suspension; and
   b) spreading the suspension over the concrete and allowing the suspension to seep into the conduits.

2. A sealing method for treating a portland cement concrete slab having hairline cracks and/or interconnected pores therein; said method comprising the steps of:
   a) mixing dry powdered montmorillonite clay particles with water to form a suspension having a viscosity that approaches the viscosity of water at room temperature; and
   b) spreading the suspension over the concrete slab and allowing the suspension to see into the hairline cracks and/or interconnected pores.

3. The sealing method of claim 2 in which is included the steps of allowing the water to evaporate from the suspension after the suspension has been spread over the concrete slab; then mixing dry powdered montmorillonite clay particles with water to form a second suspension having a viscosity that approaches the viscosity of water at room temperature; and then spreading the second suspension over the concrete slab and allowing the second suspension to seep into the hairline cracks and/or interconnected pores.

4. A method for sealing conduits in portland cement concrete, said method comprising the steps of:
   a) thoroughly and vigorously mixing one part of dry powdered montmorillonite clay particles with about 10 parts water until a uniform suspension is obtained with the clay particles discreetly suspended in the water; and then
   b) impounding the suspension on the concrete and allowing the suspension to seep into the conduits under the action of gravity.

* * * * *